United States Patent
Keeley

(10) Patent No.: US 10,690,112 B2
(45) Date of Patent: *Jun. 23, 2020

(54) FLUID TURBINE ROTOR BLADE WITH WINGLET DESIGN

(71) Applicant: William Scott Keeley, Charlestown, RI (US)

(72) Inventor: William Scott Keeley, Charlestown, RI (US)

(*) Notice: Subject to any disclaimer, the term of this patent is extended or adjusted under 35 U.S.C. 154(b) by 291 days.

This patent is subject to a terminal disclaimer.

(21) Appl. No.: 15/631,758

(22) Filed: Jun. 23, 2017

(65) Prior Publication Data

US 2017/0370345 A1 Dec. 28, 2017

Related U.S. Application Data

(60) Provisional application No. 62/355,269, filed on Jun. 27, 2016.

(51) Int. Cl.
*F03D 1/06* (2006.01)
*F03B 3/12* (2006.01)
*F03B 17/06* (2006.01)

(52) U.S. Cl.
CPC ............ *F03D 1/0675* (2013.01); *F03B 3/121* (2013.01); *F03B 17/061* (2013.01);
(Continued)

(58) Field of Classification Search
CPC .... F03D 1/0675; F03D 1/0633; F03B 17/061; F03B 3/121; Y02E 10/28; Y02E 10/721; F05B 2210/16; F05B 2240/30
See application file for complete search history.

(56) References Cited

U.S. PATENT DOCUMENTS 120,562 A 10/1871 Cracraft
7,997,875 B2 * 8/2011 Nanukuttan .......... F03D 1/0675
416/237

(Continued)

FOREIGN PATENT DOCUMENTS

EP EP2593362 B1 9/2014

OTHER PUBLICATIONS

"Short KVSR Medium 5" (Mark J Keeley) Jul. 13, 2016 [video] accessed Mar. 20, 2017 at <https://youtube.be/zCVgusrr3VA>.

*Primary Examiner* — Hung Q Nguyen
(74) *Attorney, Agent, or Firm* — Keeley DeAngelo LLP; W Scott Keeley

(57) ABSTRACT

A family of dual-winglet rotor blades are designed to dissipate the low energy flow in the wake of a turbine rotor. In some embodiments a dual-winglet having a first winglet transitioning from the lift surface of a rotor blade and a second winglet transitioning from the pressure surface of the rotor blade creates two distinct streams in the wake of the rotor. In one embodiment the first winglet curving away from the lift surface turns the lift force toward the center of the rotor plane while a second, smaller, winglet curving away from the pressure surface of the rotor blade turns the lift force away from the center of the rotor plane. In other embodiments winglets create a virtual shroud that expands the wake to dissipate the low-energy flow in the turbine wake. In another embodiment a dual winglet combines the aforementioned mixing effect with the wake expansion effect.

12 Claims, 14 Drawing Sheets

(52) U.S. Cl.
CPC ........ *F03D 1/0633* (2013.01); *F05B 2210/16* (2013.01); *F05B 2240/30* (2013.01); *Y02E 10/28* (2013.01); *Y02E 10/721* (2013.01)

(56) References Cited

U.S. PATENT DOCUMENTS

| | | | |
|---|---|---|---|
| 8,128,035 | B2 | 3/2012 | Malachowski et al. |
| 8,944,386 | B2 | 2/2015 | Gratzer |
| 10,202,961 | B2* | 2/2019 | Keeley .................. F03D 1/04 |
| 2010/0166556 | A1 | 7/2010 | Kirtley |
| 2012/0027595 | A1* | 2/2012 | Pesetsky ............ F03D 1/0633 416/147 |
| 2012/0063909 | A1* | 3/2012 | Bottome ................ F01D 5/14 416/228 |
| 2013/0309081 | A1 | 11/2013 | Huort |
| 2014/0169937 | A1 | 6/2014 | Gysling et al. |
| 2015/0003994 | A1 | 1/2015 | Braaten et al. |
| 2015/0300316 | A1 | 10/2015 | Wepfer |
| 2018/0149134 | A1* | 5/2018 | Keeley .................. F03D 1/04 |

* cited by examiner

FLUID TURBINE ROTOR BLADE WITH WINGLET DESIGN

PRIORITY CLAIM

This application claims priority to provisional patent application No. 62/355,269 filed on Jun. 27, 2016.

TECHNICAL FIELD

The present disclosure relates in general, to rotor blades for fluid turbines. Specifically, the present disclosure relates to increased power extraction by dissipating rotor wake pressure with rotor winglets.

BACKGROUND

In general, horizontal axis fluid turbine rotor blades comprise two to five blades arranged evenly about a central axis and coupled to an electrical generation machine.

Generally speaking, a fluid turbine structure with an open unshrouded rotor design captures energy from a fluid stream that is smaller in diameter than the rotor. In an open unshrouded rotor fluid turbine, as fluid flows from the upstream side of the rotor to the downstream side, the average axial fluid velocity remains constant as the flow passes through the rotor plane. Energy is extracted at the rotor resulting in a pressure drop on the downstream side of the rotor. The fluid directly downstream of the rotor is at sub-atmospheric pressure due to the energy extraction and the fluid directly upstream of the rotor is at greater than atmospheric pressure. The high pressure upstream of the rotor deflects some of the upstream air around the rotor. In other words, a portion of the fluid stream is diverted around the open rotor as if by an impediment. As the fluid stream is diverted around the open rotor, it expands, which is referred to as flow expansion at the rotor. Due to the flow expansion, the upstream area of the fluid flow is smaller than the area of the rotor.

The Betz limit calculates the maximum power that can be extracted from a volume of moving fluid by an open blade, horizontal axial flow turbine (HAWT). The Betz limit is derived from fluid dynamic control-volume theory for flow passing through an open rotor, and by applying one-dimensional equations based on the principles of the conservation of mass, momentum and energy. According to the Betz limit, and independent of the design of the fluid turbine, a maximum of 16/27 of the total kinetic energy in a volume of moving fluid can be captured by an open-rotor turbine. Conventional turbines commonly produce 75% to 80% of the Betz limit.

A fluid turbine power coefficient (Cp) is the power generated over the ideal power available by extracting all the wind kinetic energy approaching the rotor area. The Betz power coefficient of 16/27 is the maximum power generation possible based on the kinetic energy of the flow approaching the rotor, and the rotor area. For an open rotor, the rotor area used in the Betz Cp derivation is the system maximum flow area described by the diameter of the rotor blades. The maximum power generation occurs when the rotor flow velocity is the average of the upstream and downstream velocity. This is the only rotor velocity that allows the flow-field to be reversible, and the power extraction to be maximized. At this operating point, the rotor velocity is ⅔ the wind velocity, the wake velocity is ⅓ the wind velocity, and the rotor flow has a non-dimensional pressure coefficient of −⅓ at the rotor exit. The −⅓ pressure coefficient is a result of the rotor wake flow expanding out to twice the rotor exit area downstream of the rotor station.

Induced drag is generated by a rotor blade due to the redirection of fluid during the generation of lift as a column of fluid flows through the rotor plane. The redirection of the fluid may include span-wise flow along the pressure side of the rotor blade along a radial direction toward the blade tip where the fluid then flows over to the opposite side of the blade. The fluid flow over the tips joins a chord-wise flow, otherwise referred to as bypass flow, forming rotor-tip vortices. The rotor-tip vortices mix with vortices shed from the trailing edge of the rotor blade to form the rotor wake.

It is commonly known that the rotor wake affects the rotor intake. A column of fluid encounters a rotor as an impediment, in part, because a portion of the fluid flowing around the rotor expands in the wake of the rotor in a form referred to as the stream column. Fluid flowing around the rotor plane is referred to as the bypass flow. Bypass flow passes over the outer surface of the stream column. Since the stream column can be considered to be comprised of an infinite fore-body and an infinite after-body, the resulting pressure force on the stream column is zero (refer to D'Alemberts paradox). Increasing lift over the rotor, and hence increasing the amount of energy extracted from the stream column, creates slower moving flow in the rotor wake, therefore, impeding flow through the rotor. This impediment increases the volume of the rotor wake. In other words, as more power is extracted at the rotor, the rotor stream column will expand and more fluid flow will bypass the rotor. As a result, maximum power is achieved from the two opposing effects of: increased power extraction resulting in relatively lower flow rates; and reduced power extraction resulting in relatively higher flow rates.

Proposed solutions to the above mentioned paradox include: increasing the size of the wake area to allow for increased wake expansion; and injecting high-energy fluid into the rotor wake. Both solutions have been proven to allow for increased energy extraction at the rotor.

Using idealized but broadly representative models, the power coefficient of a dual-tip rotor blade based upon rotor diameter is increased over a non-tip rotor blade by the ratio of the velocity at the location of the rotor blade, divided by the free-stream fluid velocity. This is measured as velocity (U) at the rotor blade plane (P) at a power extraction factor of zero (0), referred to as UP-0. Similarly, a rotor extracting power is measured as velocity (U) at the rotor blade plane (P) from minimum power production, up to a rated power (R), referred to as UP-R.

A fluid power coefficient (Cp) is a function of wake velocity ratio and thrust coefficient (Ct). Thrust coefficient is the ratio of pressure drop across the rotor over the dynamic pressure of the wind flow, which represents a critical parameter for the design of the rotor.

Providing an area for wake expansion in the down-stream region of the rotor plane results in a low exit-plane pressure coefficient (CTE) that allows for a relatively higher rotor-thrust coefficient.

SUMMARY

Disclosed herein is an apparatus providing an annular formation of varying relative pressures, creating a mixing element on a rotor blade tip. A mixing element is designed to provide a spiral flow, following the wake of each rotor blade, of high-energy flow from ambient-flow upstream of the rotor that mixes with the rotor wake-flow downstream of the rotor. In combination, a rotor blade design and aerodynamic dual-tip diffusor and mixing element provide a system for increased energy output compared to rotors of identical total rotor diameter. A dual tip on each rotor blade is designed to take advantage of a high rotor thrust coefficient, providing reduced coefficient of pressure in the rotor-wake and a high flow stream for increased mixing of rotor-wake flow with bypass flow at the exit plane of the rotor.

A horizontal-axis fluid rotor having multiple blades with high-energy bypass flow coupled with a dual-tip rotor blade design provide increased power generation compared to a flat or non-tip rotor blade design. The dual rotor blade tips form a high-energy mixer that injects a helix of high energy bypass flow into the helical exit stream that emanates from the trailing edge and of the rotor blades.

As understood by one skilled in the art, the aerodynamic principles the present disclosure are not restricted to a specific fluid, and may apply to any fluid, defined as any liquid, gas or combination thereof and, therefore, includes water as well as air. In other words, the aerodynamic principles of a dual-tip wind rotor blade apply to hydrodynamic principles in a dual-tip water rotor blade.

These and other non-limiting features or characteristics of the present disclosure will be further described below.

BRIEF DESCRIPTION OF THE DRAWINGS

The following is a brief description of the drawings, which are presented for the purposes of illustrating the disclosure set forth herein and not for the purposes of limiting the same. Example embodiments of the present disclosure are further described with reference to the appended figures. It is to be noted that the various features and combinations of features described below and illustrated in the figures can be arranged and organized differently to result in embodiments which are still within the spirit and scope of the present disclosure. To assist those of ordinary skill in the art in making and using the disclosed systems, assemblies and methods, reference is made to the appended figures, wherein.

DETAILED DESCRIPTION

Figure 1:
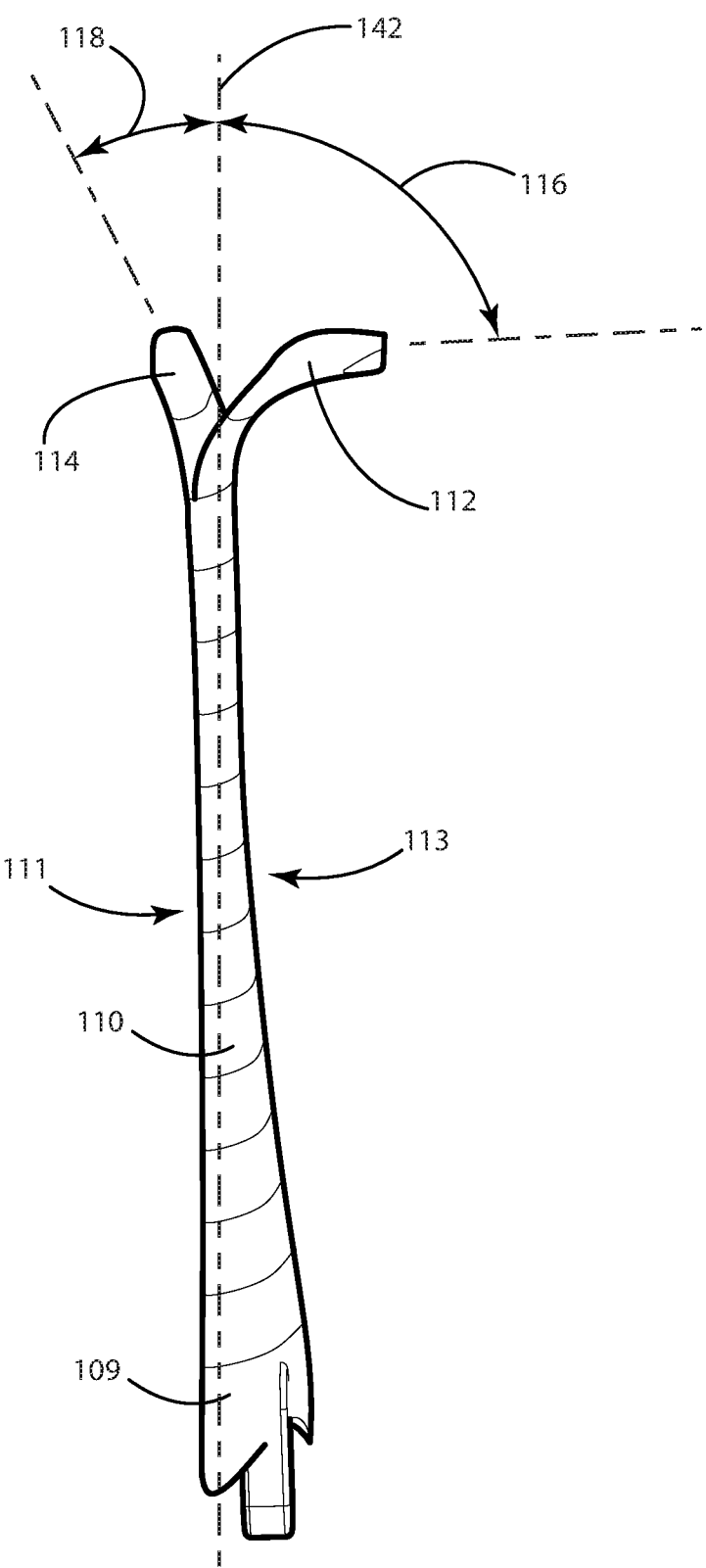
FIG. 1 is front, perspective view of the present embodiment.

The example embodiments disclosed herein are illustrative of advantageous fluid rotor systems, and assemblies of the present disclosure and methods or techniques thereof. It should be understood, however, that the disclosed embodiments are merely examples of the present disclosure, which may be embodied in various forms. Therefore, details disclosed herein with reference to example fluid rotor systems or fabrication methods and associated processes or techniques of assembly and or use are not to be interpreted as limiting, but merely as the basis for teaching one skilled in the art how to make and use the advantageous fluid rotor systems of the present disclosure.

A more complete understanding of the components, processes, and apparatuses disclosed herein can be obtained by reference to the accompanying figures. These figures are intended to demonstrate the present disclosure and are not intended to show relative sizes and dimensions or to limit the scope of the example embodiments.

Although specific terms are used in the following description, these terms are intended to refer to particular structures in the drawings and are not intended to limit the scope of the present disclosure. It is to be understood that like numeric designations refer to components of like function.

The term "rotor" or "rotor assembly" is used herein to refer to any assembly in which blades are attached to a shaft and able to rotate, allowing for the generation of power or energy from fluid rotating the blades. Example embodiments of the present disclosure disclose a fixed-blade rotor or a rotor assembly having blades that do not change configuration so as to alter their angle or attack, or pitch.

In certain embodiments, the leading edge of a rotor assembly may be considered the front of the fluid rotor system, and the trailing edge of a rotor assembly may be considered the rear of the fluid rotor system.

FIG. 1 presents a front perspective view of a rotor of the present disclosure having a dual-tip, also referred to as a dual winglet or double winglet. The rotor has a primary structure, otherwise referred to as the rotor shaft 110 that extends from the root 109 to the dual tip, having pressure-surface 111 and a lift surface 113 according to the shape of the airfoil cross section. The rotor blade 100 further comprises a pressure-surface winglet 114 and a lift-surface winglet 112. The pressure-surface winglet 114 turns from the pressure-surface 111 to angle 118 that is between 15° and 35° with respect to a vertical centerline 142 that resides along the rotor shaft 110 and is proximal to the center of gravity of each cross section along the rotor shaft 110. The lift-surface winglet 112 turns from the lift-surface 113 at angle 116 that is between 70° and 120° with respect to vertical centerline 142.

Figure 2:
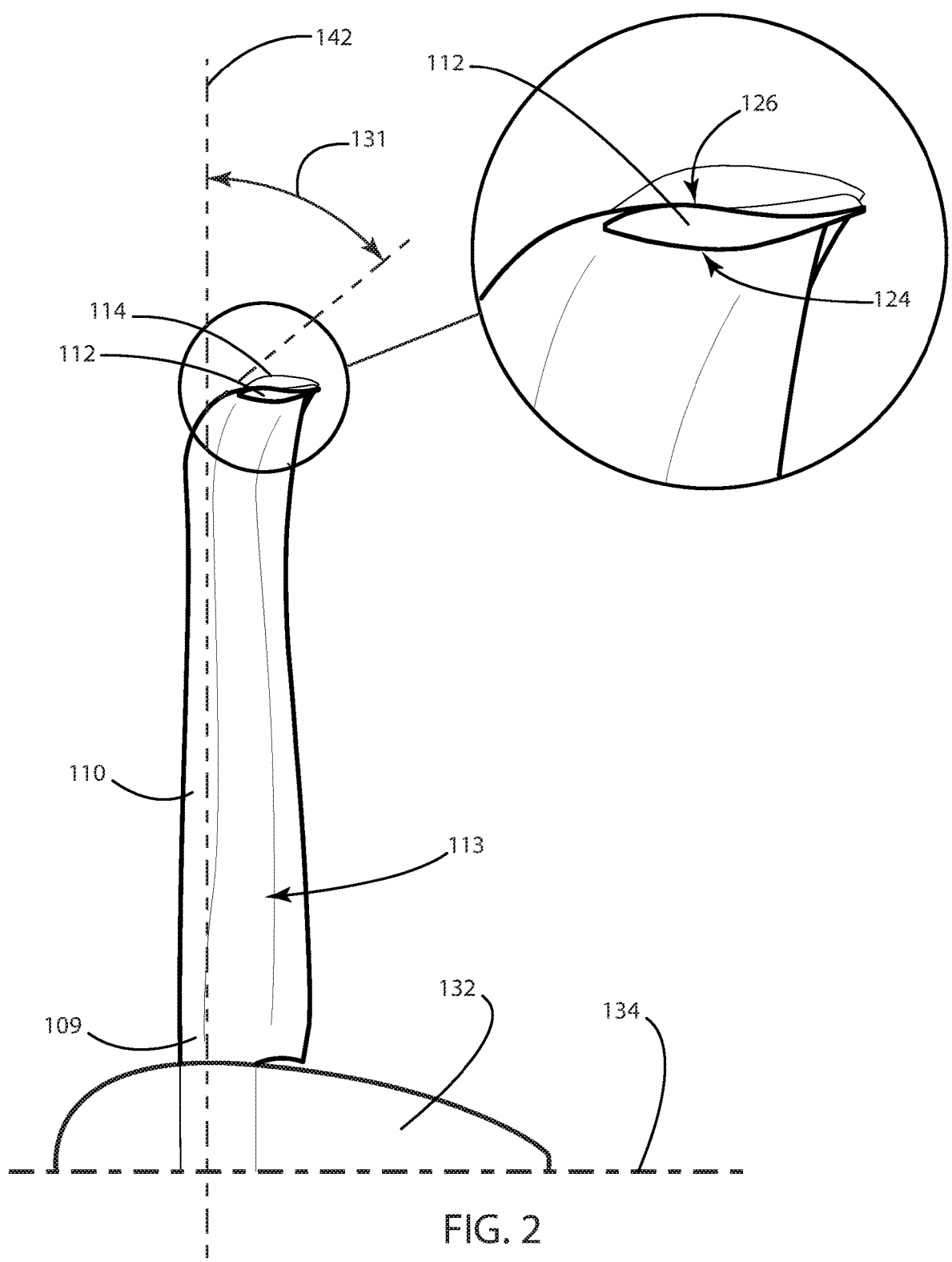
FIG. 2 is a detail view of the dual-tip rotor of the present embodiment.

FIG. 2 presents a detailed view of the lift-surface winglet. The rotor shaft 110 is rotationally engaged at the root 109 with a nacelle 132 shown in section view against a horizontal center-line 134. The lift-surface winglet 112 has a lift surface 124 and a pressure surface 126. The lift surface 124 transitions from the lift surface 113 of the primary shaft 110. The leading edge of the rotor shaft 110 transitions along the first winglet toward the trailing edge at an angle 131 that is between 20° and 60° with respect to the vertical centerline 142.

Figure 3:
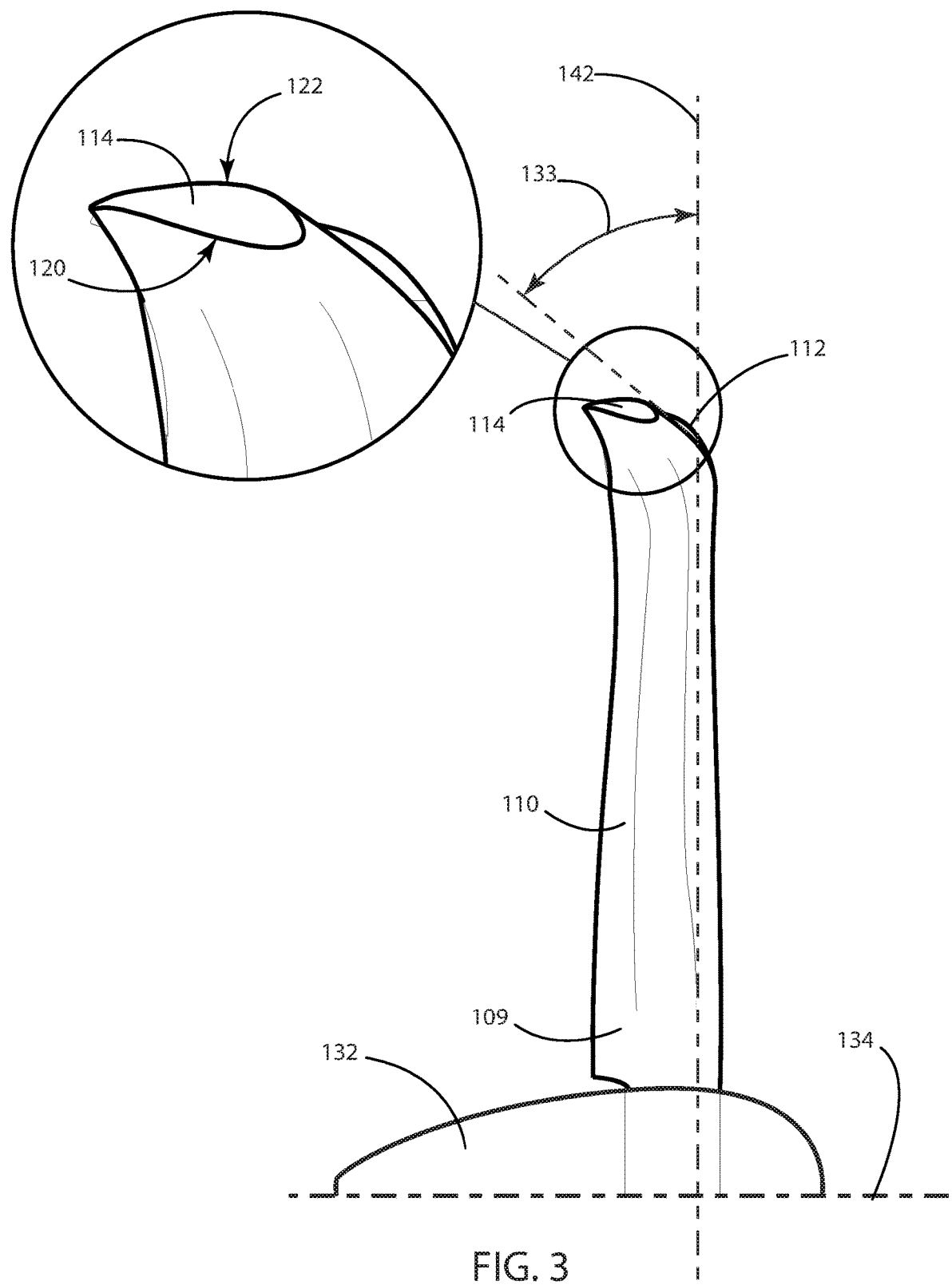
FIG. 3 is a detail view of the dual-tip rotor of the present embodiment

FIG. 3 presents a detailed view of the pressure-surface winglet. The rotor shaft 110 is rotationally engaged at the root 109 with a nacelle 132 shown in section view against a horizontal center-line 134. The pressure-surface winglet 114 is an airfoil that has a lift surface 122 and a pressure surface 120. The leading edge of the rotor shaft 110 transitions along the second winglet toward the trailing edge at an angle 133 that is between 20° and 60° with respect to the vertical centerline 142. One skilled in the art will understand that the lift surfaces will create increased velocity and decreased pressure when compared to the increased pressure and decreased velocity in the flow over the pressure surface.

Figure 4:
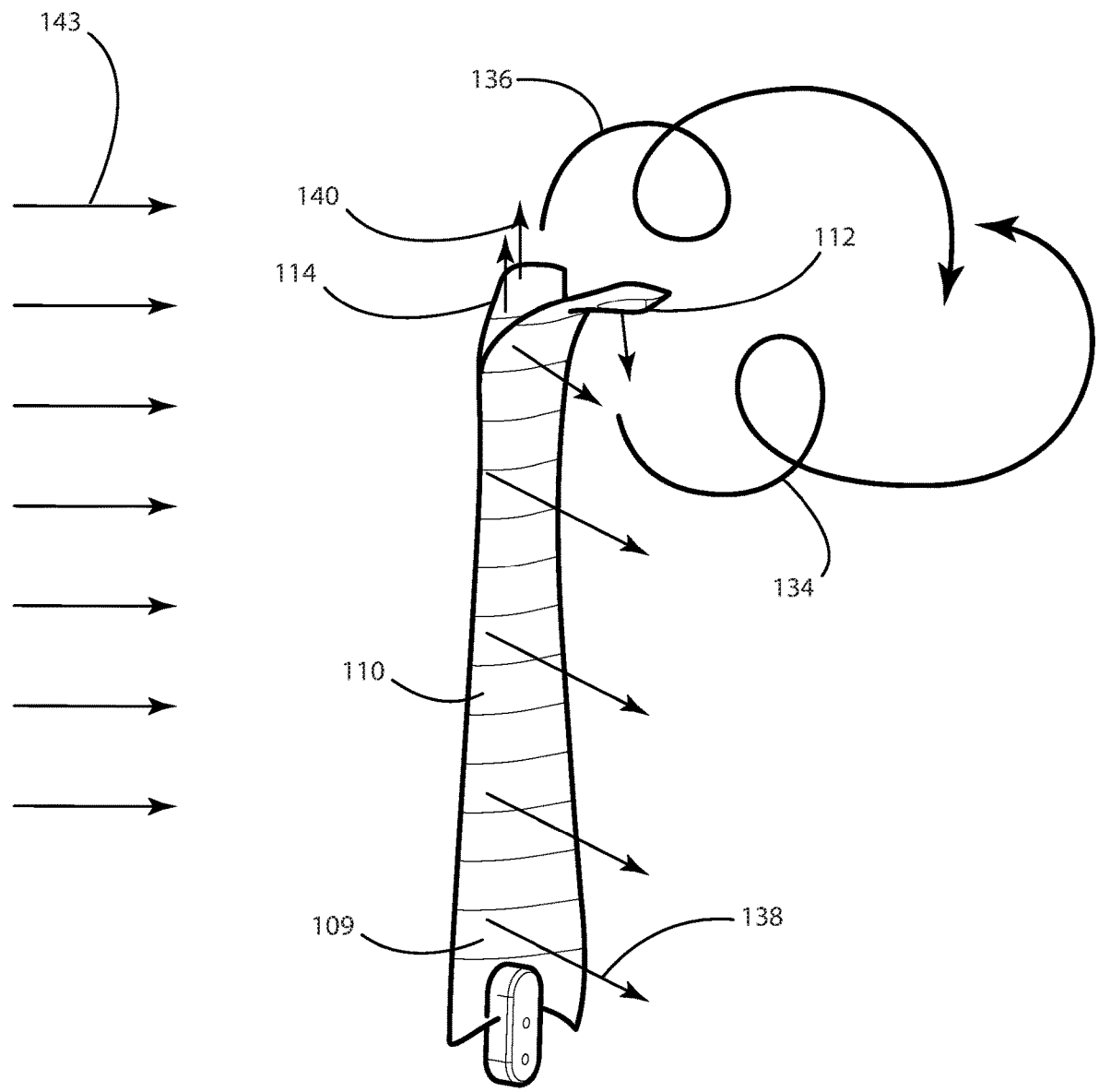
FIG. 4 is a diagram depicting the fluid-stream flow over the dual-tip rotor of the present embodiment.

FIG. 4 presents a side perspective view of a rotor of the present embodiment. A column of air 143 encounters the rotor and results in lift, represented by vectors 138 that change direction as the encounter the winglets. The lift side of each winglet divides the overall lift into two streams at the dual winglet. Stream 136 is created by the pressure-surface winglet 114 and stream 134 is created by the lift-surface winglet 112. These two streams 136, 134, are counter rotating vortices that mix free stream, or bypass, flow into the wake of the rotor. In other words, stream 136 mixes bypass flow from the column of moving air 143, into the counter-rotating vortices 134.

The fluid power coefficient (Cp) as a function of wake velocity ratio and thrust coefficient (Ct) may be increased because of the low exit-plane pressure coefficient (CTE) that allows for a relatively higher rotor-thrust coefficient. The rotor design may take advantage of a highly cambered rotor shaft 110, designed for a greater Cp without stalling as it would without the dual winglet.

Figure 5:
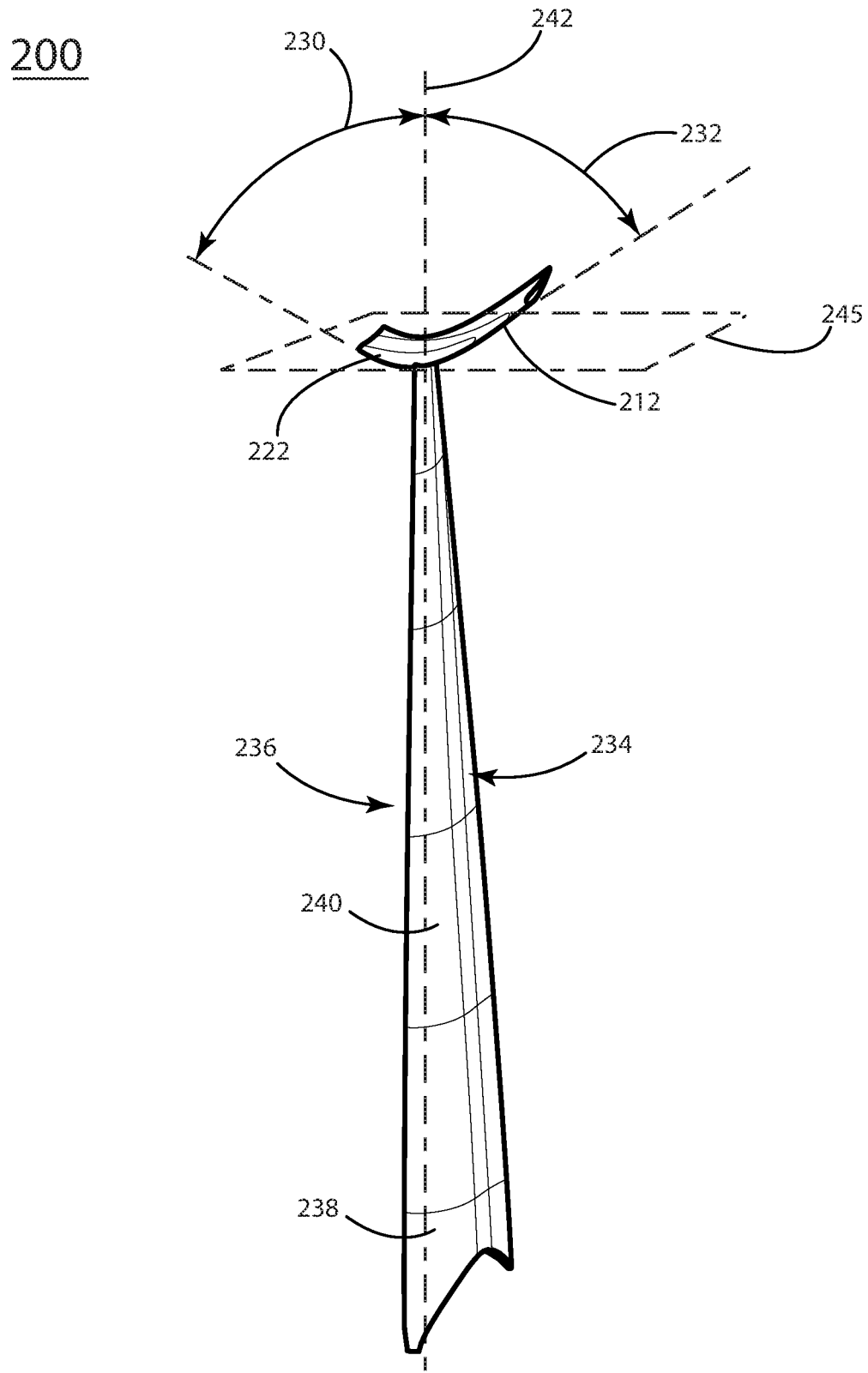
FIG. 5 is front, perspective view an iteration of the present embodiment.

Referring to FIG. 5, the illustration depicts an iteration of a rotor blade design, the embodiment having a dual winglet on the tip of the rotor blade 200. The rotor has a primary structure, otherwise referred to as the rotor shaft 240 that extends from the root 238 to the dual tip along a vertical centerline 242. The shaft 240 has a pressure-surface 236 and a lift surface 234 according to the shape of the airfoil cross sections. The rotor blade 200 further comprises a winglet that meets the shaft 240 at the rotor tip which is furthest from the root 238. A plane 245 is perpendicular to the vertical centerline 242 proximal to the rotor tip. An arcuate winglet adjoins the rotor shaft proximal to the tip. The winglet is tangent to the plane 245 where it adjoins the rotor shaft 240. A first arcuate extension 212 extends downwind from the rotor shaft at an angle 232 that is generally between 5° and 65° with respect to a vertical centerline 242 and preferably between 30° and 60° with respect to the vertical centerline 242. A second arcuate extension 214 extends upwind from the rotor shaft at an angle 232 that is generally between 5° and 65° with respect to a vertical centerline 242 and preferably between 30° and 60° with respect to the vertical centerline 242.

One skilled in the art understands that the winglet exists in the upwind area and the downwind area with respect to the centerline and that the airfoil cross sections at either end of the arcuate winglet may be similar to those that transition from the lift surface 234 and pressure surface 236 as illustrated in the aforementioned embodiment (FIG. 4).

Figure 6:
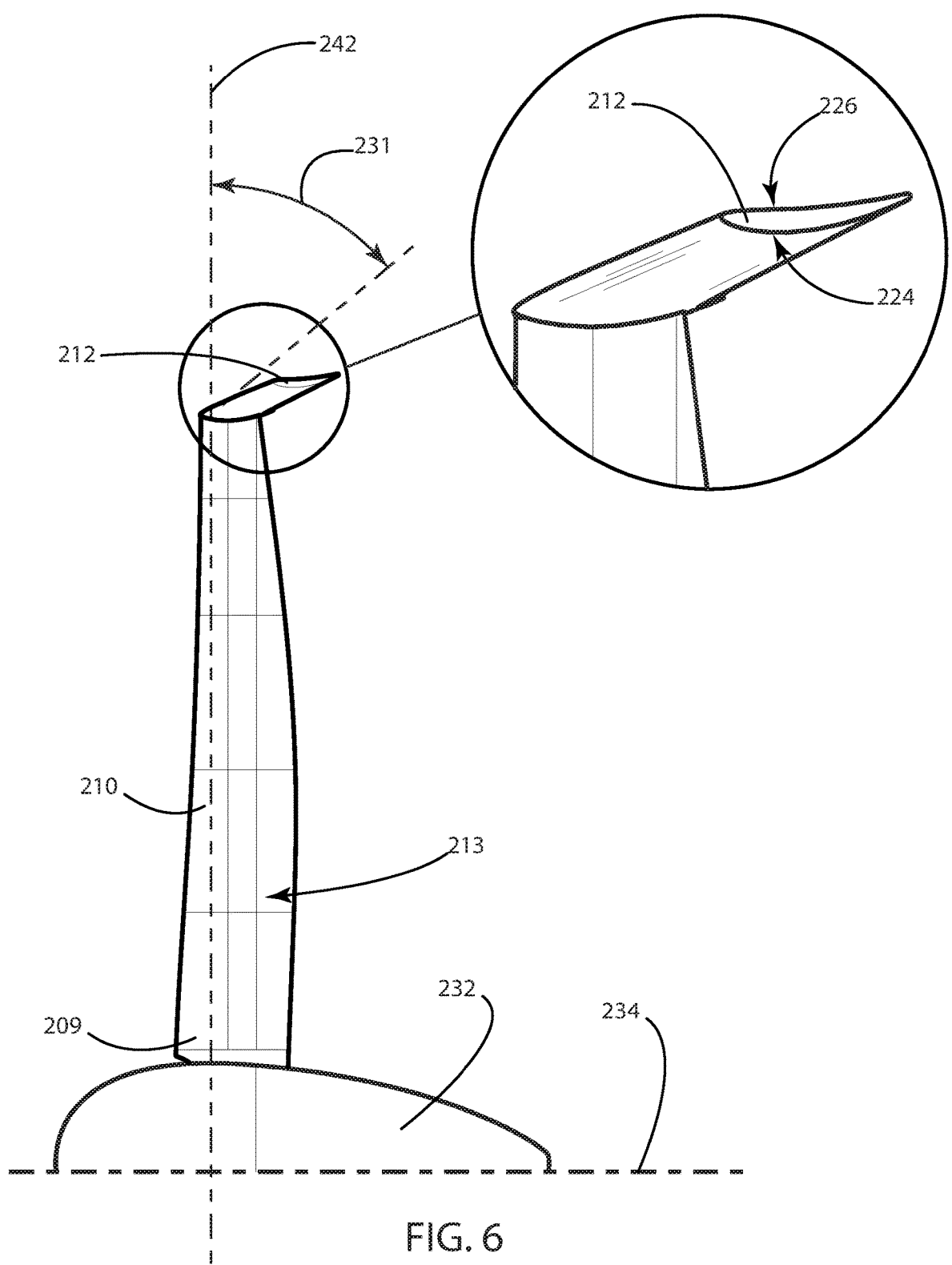
FIG. 6 is a detail view of the dual-tip rotor of the iteration of FIG. 5.

FIG. 6 presents a detailed view of the first arcuate extension of the winglet of the iteration of the embodiment of FIG. 5. The rotor shaft 210 is rotationally engaged at the root 209 with a nacelle 232 shown in section view against a horizontal center-line 234. The first arcuate extension of the winglet 212 has a lift surface 224 and a pressure surface 226. The leading edge first arcuate extension of the winglet transitions along the first arcuate extension toward the trailing edge at an angle 233 that is between 20° and 75° with respect to the vertical centerline 242.

Figure 7:
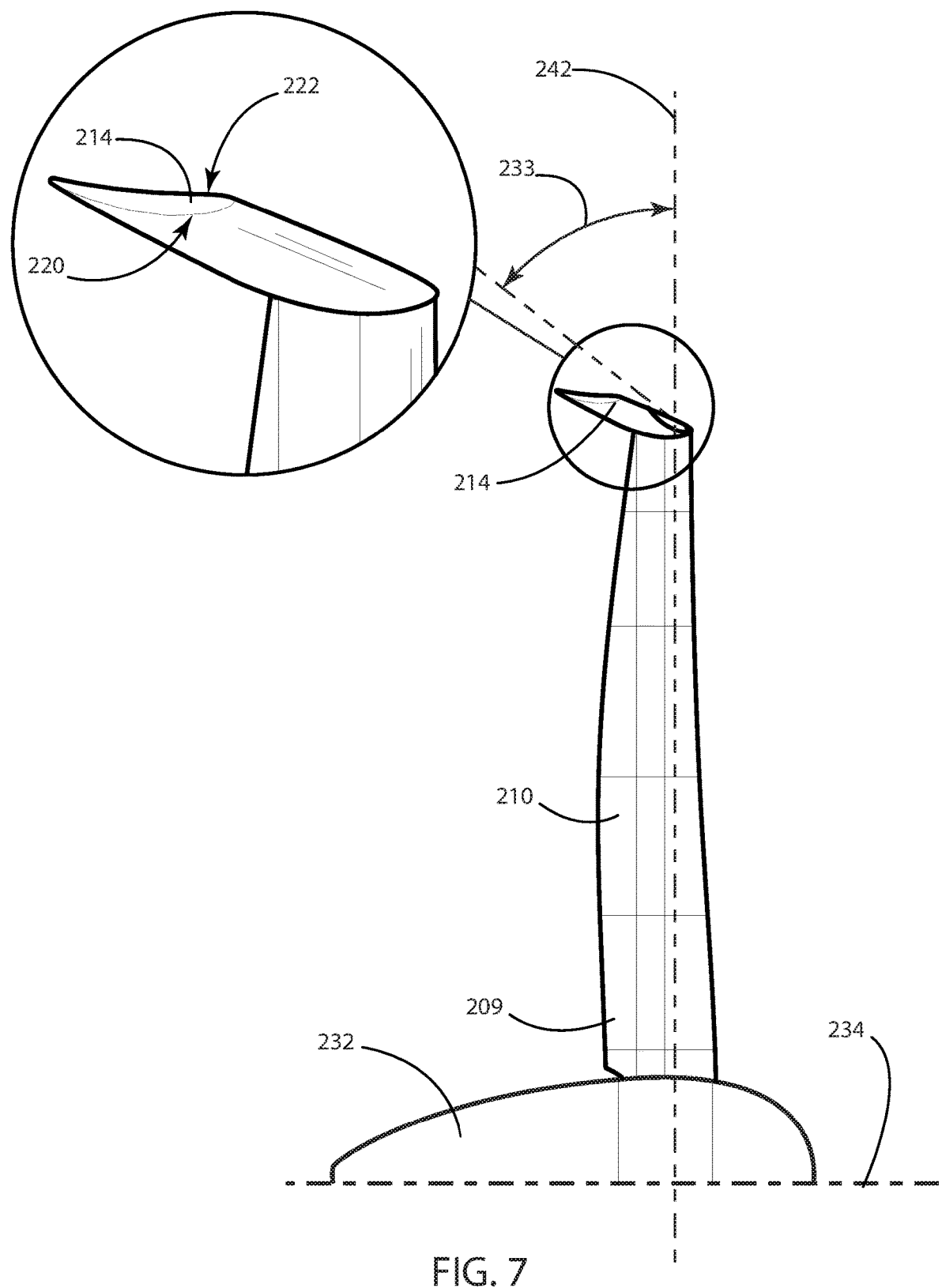
FIG. 7 is a detail view of the dual-tip rotor of the iteration of FIG. 5.

FIG. 7 presents a detailed view of the second arcuate extension of the winglet. The rotor shaft 210 is rotationally engaged at the root 209 with a nacelle 232 shown in section view against a horizontal center-line 234. The second arcuate extension of the winglet 214 is an airfoil that has a lift surface 222 and a pressure surface 220. The leading edge of the second arcuate extension of the winglet transitions along the second arcuate extension toward the trailing edge at an angle 235 that is between 20° and 75° with respect to the vertical centerline 242. One skilled in the art will understand that the lift surfaces will create increased velocity and decreased pressure when compared to the increased pressure and decreased velocity in the flow over the pressure surface.

Figure 8:
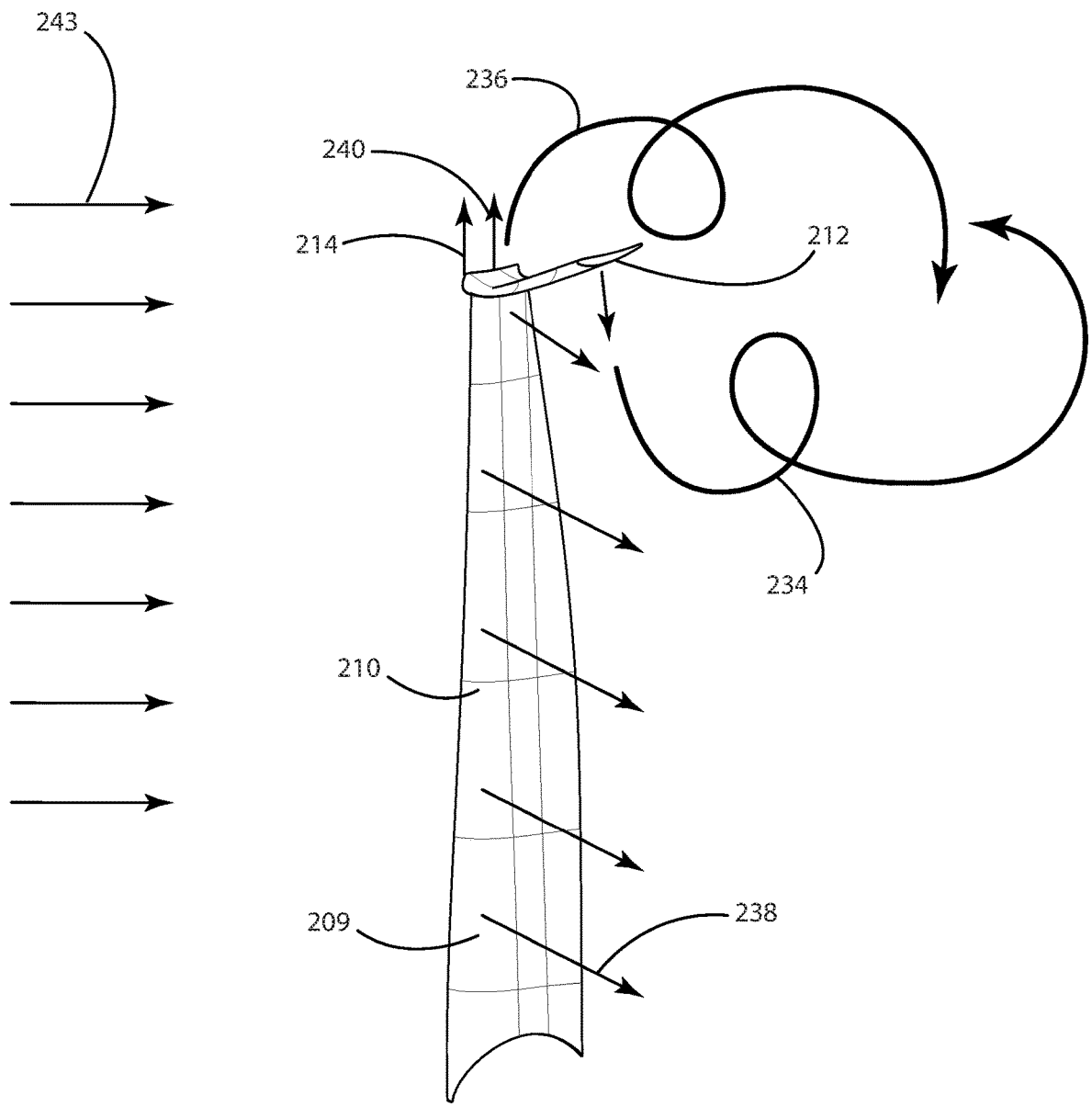
FIG. 8 is a diagram depicting the fluid-stream flow over the dual-tip rotor of the iteration of FIG. 5.

FIG. 8 presents a side perspective view of a rotor of the iteration of the embodiment of FIG. 5. A column of moving air 243 encounters the rotor and results in lift, represented by vectors 238 that change direction as the encounter the arcuate extensions of the winglet. The lift side of each arcuate extension divides the overall lift into two streams. Stream 236 is created by the second arcuate extension 214 and stream 234 is created by the first arcuate extension 212. These two streams 236, 234, are counter rotating vortices that mix free stream, or bypass, flow into the wake of the rotor. In other words, stream 236 mixes bypass flow from the column of moving air 243, into the counter-rotating vortices 234.

Figure 9:
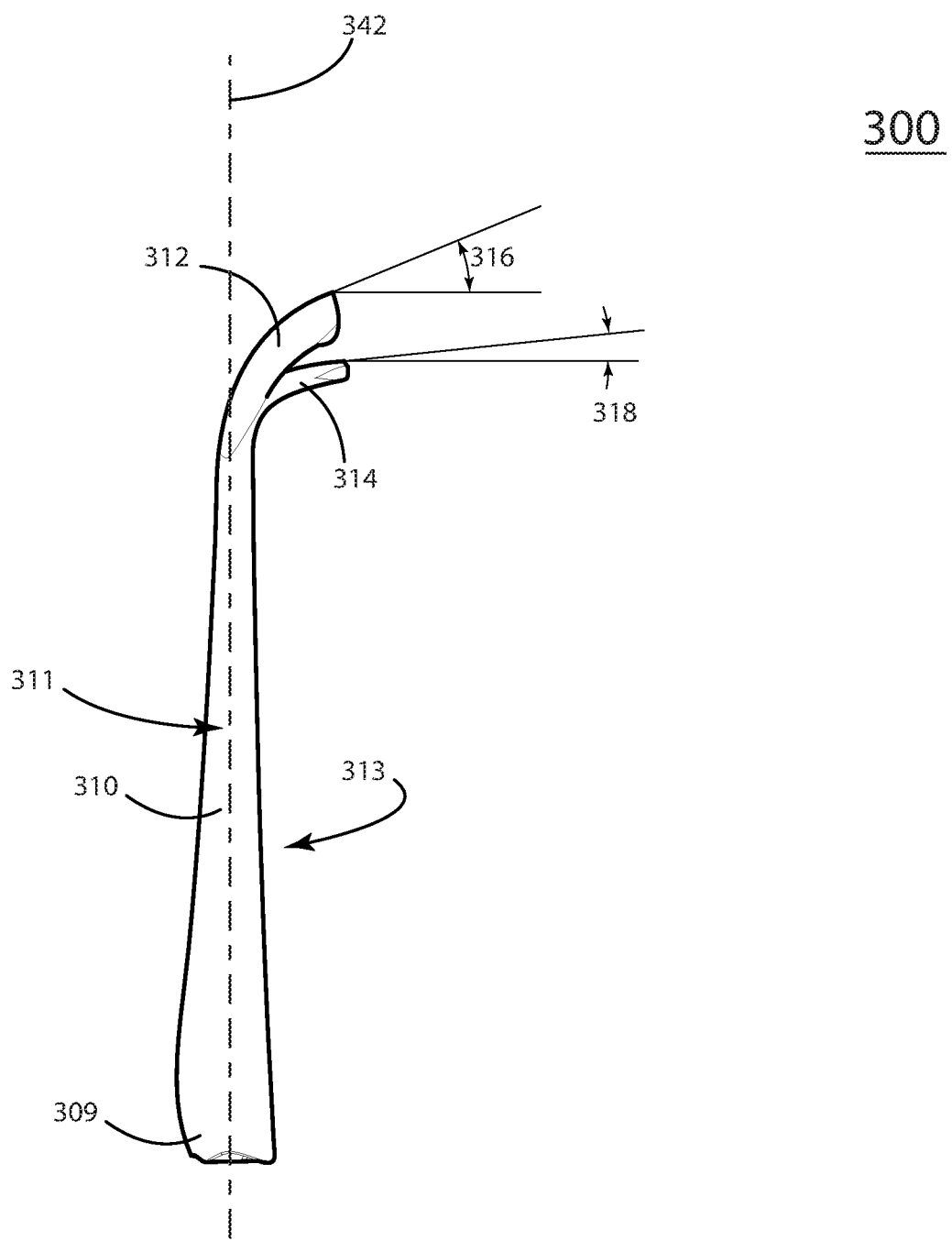
FIG. 9 is front, perspective view of an iteration of the embodiment.

FIG. 9 presents a front perspective view of a rotor of an iteration of the present disclosure having a dual-tip, also referred to as a dual winglet or double winglet. The rotor has a primary structure, otherwise referred to as the rotor shaft 310 that extends from the root 309 to the dual tip, having pressure-surface 311 and a lift surface 313, on the opposite side of the pressure-surface, according to the shape of the airfoil cross section. A centerline 342 resides along the center of the long axis of the rotor shaft 310. The rotor blade 300 further comprises a first winglet 314 and a second winglet 312. The first winglet 314 turns from the lift-surface 313 to angle 318 that is between 15° and 35° with respect to a plane that is perpendicular to a vertical centerline 342. The second winglet 312 turns from the lift-surface 313 at angle 316 that is between 70° and 120° with respect to a plane that is perpendicular to a vertical centerline 342.

Figure 10:
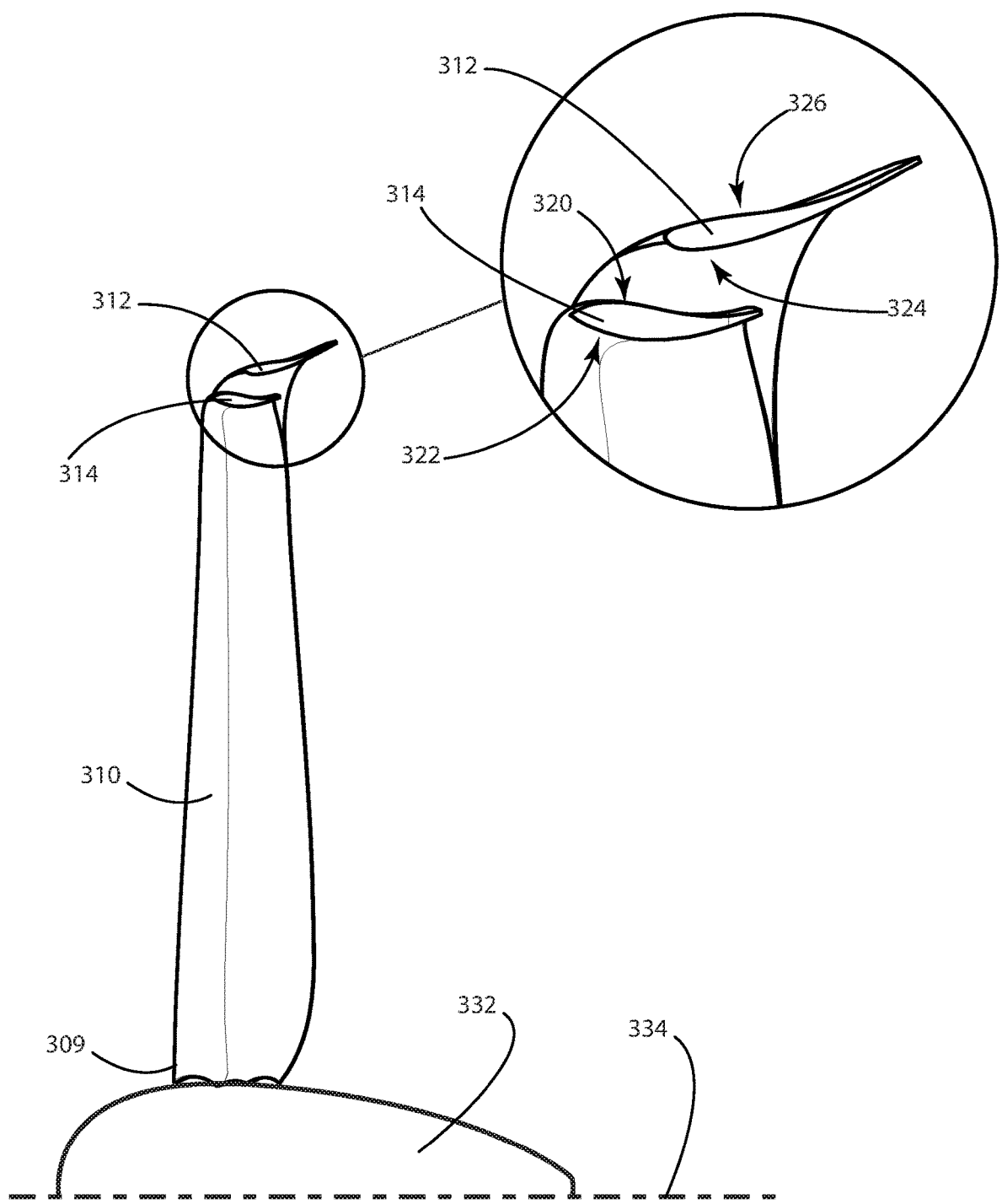
FIG. 10 is a detail view of the dual-tip rotor of the iteration of FIG. 9.

FIG. 10 presents a detailed view of the dual-winglet of the iteration of the embodiment 300 of FIG. 9. The rotor shaft 310 is engaged at the root 309. The root 309 is rotationally engaged with a nacelle 332 shown in section view against a horizontal center-line 334. The second winglet 312 has a lift surface 324 and a pressure surface 326. The first winglet 314 is an airfoil that has a lift surface 322 and a pressure surface 320. One skilled in the art will understand that the lift surfaces will create increase velocity and decreased pressure when compared to the decreased velocity and increased pressure in the flow over the pressure surface of the respective airfoils.

Figure 11:
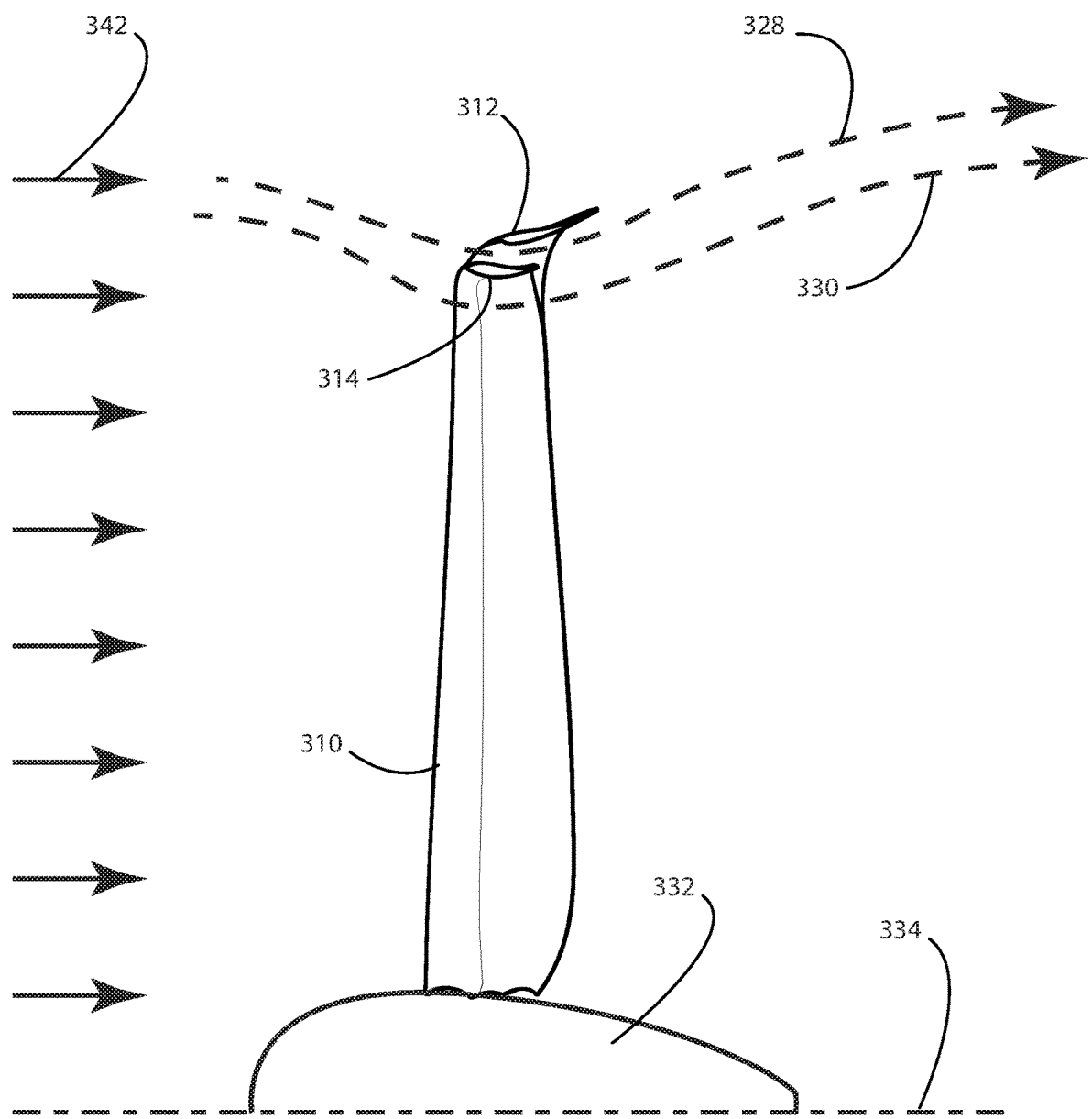
FIG. 11 is a diagram depicting the fluid-stream flow over the dual-tip rotor of the iteration of FIG. 9.

FIG. 11 presents a side, section view of a rotor of the iteration of the embodiment 300. A column of air 342 encounters the rotor and results in lift over the rotor shaft and thus rotation of the rotor about the nacelle 332. A cross section of the flow over the dual winglet is described by flow vectors 328 and 330. The highly cambered airfoils 314 and 312 create a virtual shroud, thus imitating the effect of a duct surrounding the rotor 310. The resultant flow vectors 328 and 330 create a bell shaped area in the wake of the rotor plane. This expanding area creates a region for the low pressure in the wake of the turbine to expand, thus dissipating the wake flow, allowing the flow to return to ambient more rapidly than a rotor without the dual winglet and therefore allowing for a rotor with an airfoil cross section capable of greater energy extraction without stall.

Figure 12:
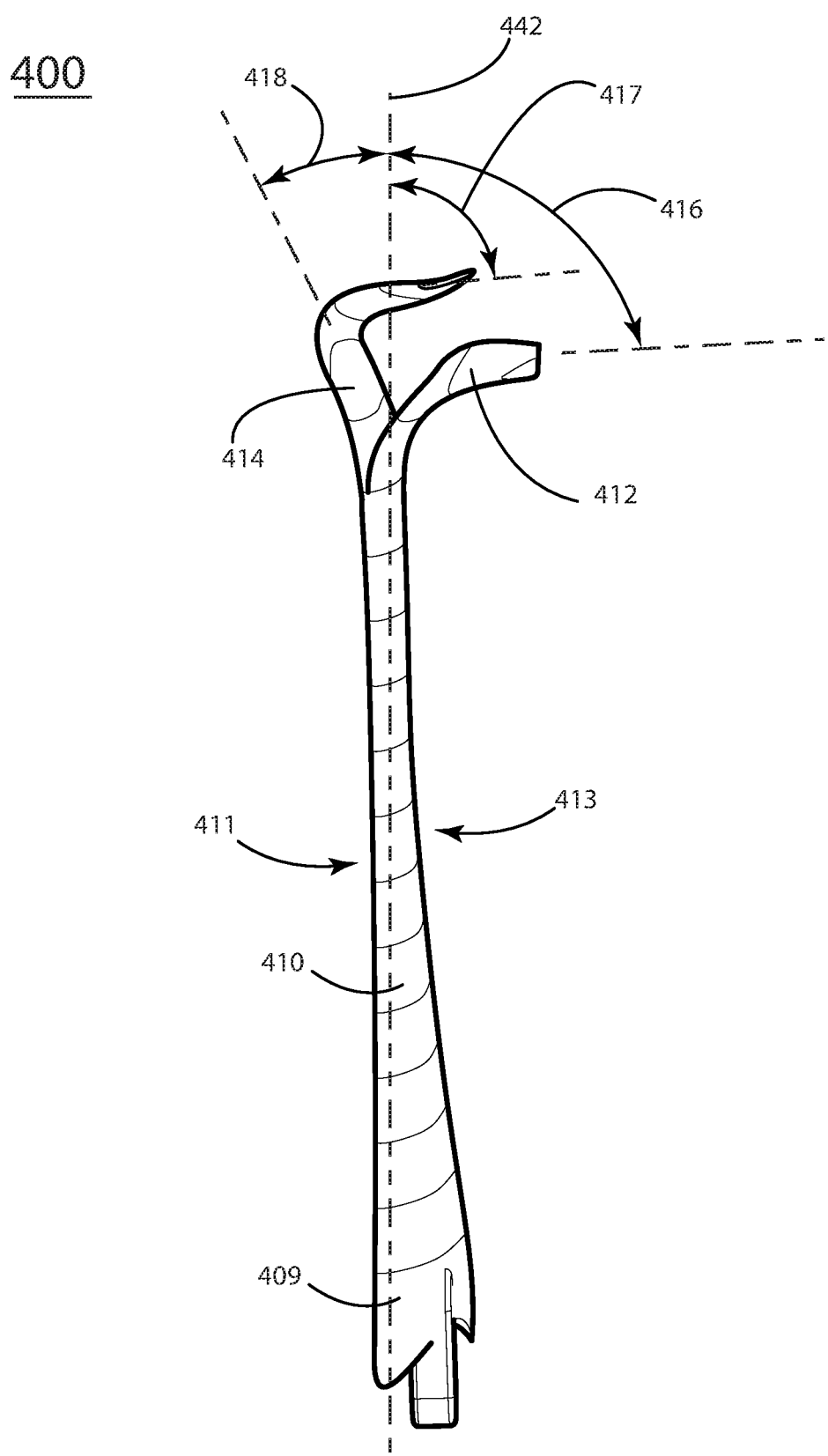
FIG. 12 is front, perspective view of an iteration of the embodiment.

FIG. 12 presents a front perspective view of a rotor of the iteration of the embodiment of the disclosure having a dual-tip, also referred to as a dual winglet or double winglet. The rotor has a primary structure, otherwise referred to as the rotor shaft 410 that extends from the root 409 to the dual tip, having pressure-surface 411 and a lift surface 413 according to the shape of the airfoil cross section. A centerline 442 extends from the root through the tip along the rotor shaft 410. The rotor blade 400 further comprises a pressure-surface winglet 414 and a lift-surface winglet 412. The pressure-surface winglet 414 turns from the pressure-surface 411 to angle 418 that is between 15° and 35° with respect to the centerline 442. The pressure-surface winglet 414 then turns downwind at angle 417 that is between 75° and 95° with respect to the vertical centerline 442. The lift-surface winglet 412 turns from the lift-surface 413 at angle 416 that is between 70° and 120° with respect to the centerline 442.

Figure 13:
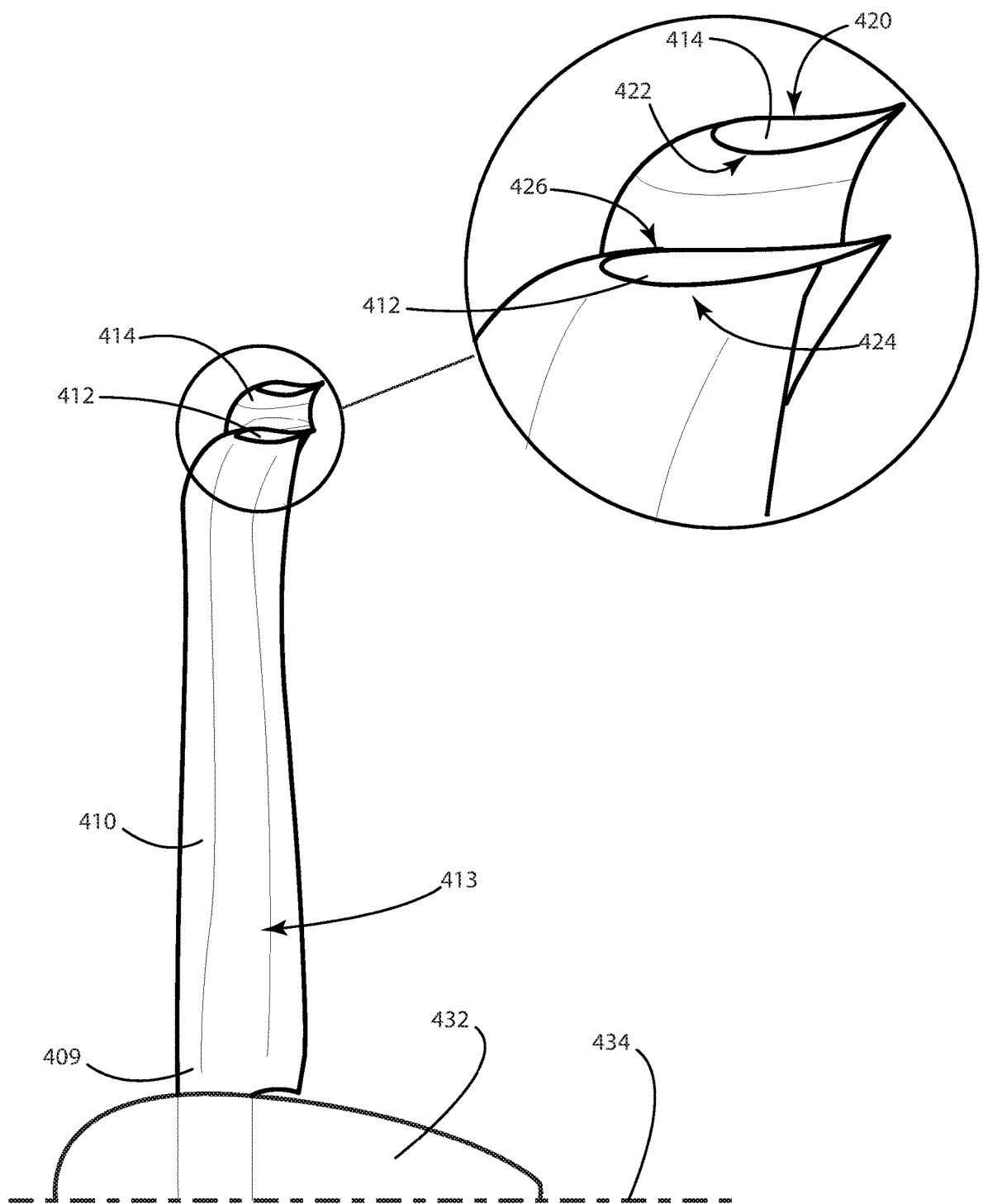
FIG. 13 is a detail view of the dual-tip rotor of the embodiment of FIG. 12.

FIG. 13 presents a detailed view of the wing-tips that make up the double winglet of the iteration of the embodiment 400 of FIG. 12. The rotor shaft 410 is engaged at the root 409. The root 409 is rotationally engaged with a nacelle 432 shown in section view against a center-line 434. The dual winglet is made up of a first winglet 412 and a second winglet 414. The first winglet 412 has a lift surface 424 and a pressure surface 426. The second winglet 414 is an airfoil that has a lift surface 422 and a pressure surface 420. One skilled in the art will understand that the lift surfaces will create increase velocity and decreased pressure when compared to the decreased velocity and increased pressure in the flow over the pressure-surface of the respective airfoils.

Figure 14:
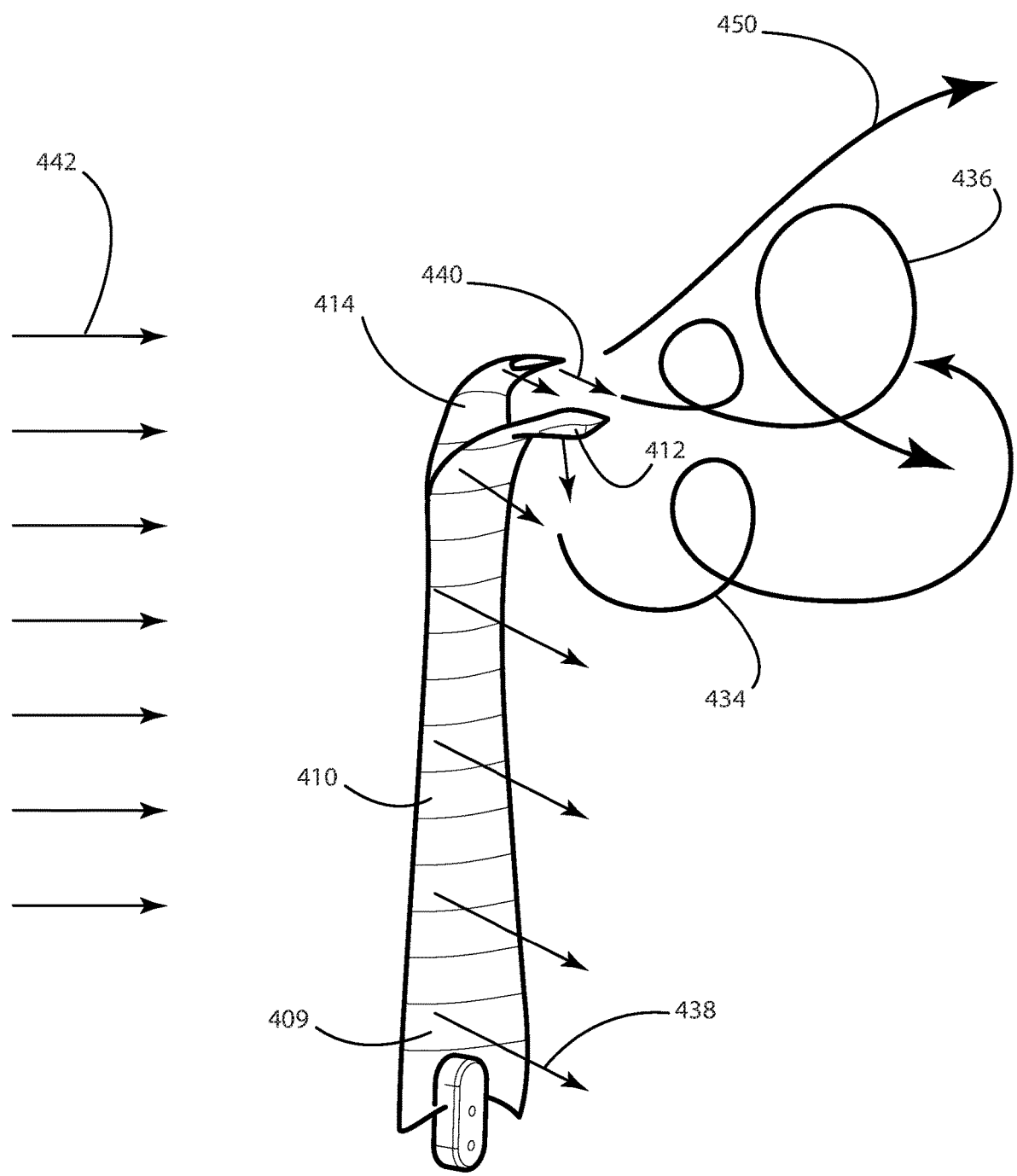
FIG. 14 is a diagram depicting the fluid-stream flow over the dual-tip rotor of the embodiment of FIG. 12.

FIG. 14 presents a side perspective view of a rotor of the present embodiment. A column of air 442 encounters the rotor and results in lift, represented by vectors 438 that change direction as the encounter the winglets. The lift side of each winglet divides the overall lift into two streams at the dual winglet. Stream 436 is created by the second winglet 414 and stream 434 is created by the first winglet 412. These two streams 436, 434, cause counter rotating vortices that mix free stream, or bypass, flow into the wake of the rotor. In other words, stream 436 mixes bypass flow from the column of moving air 442, into the counter-rotating vortices 434.

The winglet 414 turns both upstream and downstream. When turning upstream the counter rotating vortices 436 are created. The portion of the winglet 414 that turns downstream creates and expanding stream 450. The expanding flow over the dual winglet is described by flow vector 450. The highly cambered airfoils 414 and 412 create a virtual shroud, thus imitating the effect of a duct surrounding the rotor 410. The resultant flow vector 450 creates a bell shaped area in the wake of the rotor plane. This expanding area creates a region for the low pressure in the wake of the turbine to expand, thus dissipating the wake flow, allowing the flow to return to ambient more rapidly than a rotor without the dual winglet and therefore allowing for a rotor with an airfoil cross section capable of greater energy extraction without stall. One skilled in the art understands the effects of wake mixing and wake expansion that are affected by the afore-described dual winglet.

The present disclosure has been described with reference to example embodiments. Modifications and alterations will occur to others upon reading and understanding the preceding detailed description. It is intended that the present disclosure be construed as including all such modifications and alterations insofar as they come within the scope of the appended claims or the equivalents thereof.

Although the systems and methods of the present disclosure have been described with reference to example embodiments thereof, the present disclosure is not limited to such example embodiments and or implementations. Rather, the systems and methods of the present disclosure are susceptible to many implementations and applications, as will be readily apparent to persons skilled in the art from the disclosure hereof. The present disclosure expressly encompasses such modifications, enhancements and or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

The invention claimed is:

1. A rotor blade for a fluid turbine comprising:
   an upwind direction; and
   a downwind direction; and
   a root region; and
   a tip region; and
   a body extending from said root region to said tip region; and
   said body further comprising an airfoil cross section, said airfoil cross section comprising:
      a leading edge; and
      a trailing edge; and
      a lift surface; and
      a pressure surface; and
   said tip region comprising a first winglet and a second winglet; and
   said first winglet extending arcuately away from said lift surface in said downwind direction; and
   said leading edge transitioning along said first winglet toward said trailing edge; and
   said second winglet extending arcuately away from said pressure surface in said upwind direction; and
   said leading edge transitioning along said second winglet toward said trailing edge.

2. The rotor blade of claim 1 further comprising;
   said leading edge of said rotor shaft transitioning along said first winglet toward said trailing edge at an angle between 20° and 60°,
   said leading edge of said rotor shaft transitioning along said second winglet toward said trailing edge at an angle between 20° and 60°.

3. The rotor blade of claim 1 further comprising:
   said first winglet is at least 30% longer than said second winglet; and
   a rotor swept area providing a rotor plane having a center and a perimeter; and
   said first winglet is comprised of an airfoil profile having a lift surface facing toward the center of the rotor plane and a pressure surface facing away from the center of the rotor plane; and
   said second winglet comprised of an airfoil profile having a lift surface facing away from the center of the rotor plane and a pressure surface facing toward the center of the rotor plane;
   wherein, the winglet airfoils, being in opposite directions with respect to each other's lift and pressure surfaces, create counter rotating vortices in the wake of the rotor plane thus mixing relatively higher energy fluid into the relatively low energy wake of the rotor.

4. The rotor blade of claim 1 wherein:
said first winglet transitions arcuately away from said lift surface at an angle that is between 70° and 120°; and
said second winglet transitions arcuately away from said pressure surface at an angle that is between 15° and 35°.

5. A rotor blade for a fluid turbine comprising:
an upwind direction; and
a downwind direction; and
a root region; and
a tip region; and
a body extending from said root region to said tip region; and
said body further comprising an airfoil cross section, said airfoil cross section comprising:
a leading edge; and
a trailing edge; and
a lift surface; and
a pressure surface; and
said leading edge transitioning into a fork shape having a first leading-edge fork direction and a second leading-edge fork direction; and
said first leading-edge fork direction turning arcuately in said downwind direction; and
said second leading-edge fork direction turning arcuately in said upwind direction; and
said trailing edge transitioning into a fork shape having a first trailing-edge fork direction and a second trailing-edge fork direction; and
said first trailing-edge fork direction turning arcuately in said downwind direction; and
said second trailing-edge fork direction turning arcuately in said upwind direction; wherein
said fork shape of said trailing-edge having a first fork, and a second fork; and
said first fork shape and said second fork shape each having a lift surface and a pressure surface; and
said lift surface of said first fork shape facing the opposite direction of said lift surface on said second fork shape.

6. The rotor blade of claim 5 wherein
said rotor plane has a center and a perimeter, the center proximal to the root of the rotor blades, the perimeter proximal to the a region past the tip of the rotor blades; and
said first leading-edge fork direction turning arcuately in said downwind direction transitions to a lift surface that faces toward the center of the rotor plane; and
said second leading-edge fork direction turning arcuately in said upwind direction transitions to a lift surface that faces toward the perimeter of the rotor plane.

7. A rotor blade for a fluid turbine comprising:
an upwind direction; and
a downwind direction; and
a root region; and
a tip region; and
a body extending from said root region to said tip region; and
a vertical centerline proximal to the center of gravity of any cross section of said body extending from said root region past said tip region; and
said body further comprising an airfoil cross section, said airfoil cross section comprising:
a leading edge; and
a trailing edge; and
a lift surface; and
a pressure surface; and
a winglet fixedly engaged with said body, proximal to said tip region; and
said winglet having an arcuate shape that is tangent to a plane that is perpendicular to said vertical centerline at the point of engagement with said body; and
said winglet having a first arcuate extension and a second arcuate extension; and
said first arcuate extension extending in a down-wind direction; and
said second arcuate extension extending in an upwind direction; and
both arcuate extensions swept away from said leading edge of said body.

8. The rotor blade of claim 7 wherein;
said first arcuate extension is swept away from said leading edge of said body such that a line tangent to the end of the first arcuate extension is between 5° and 65° with respect to the vertical centerline; and
said second arcuate extension is swept away from said leading edge of said body such that a line tangent to the end of the second arcuate extension is between 5° and 65° with respect to the vertical centerline.

9. The rotor blade of claim 7 wherein
the first arcuate extension is at least 10% longer than the second arcuate extension.

10. The rotor blade of claim 7 wherein;
said first arcuate extension of said winglet having an airfoil cross section; and
said airfoil cross section on said first arcuate extension having a lift surface and a pressure surface; and
said lift surface on said first arcuate extension of said winglet facing toward the center of the rotor plane; and
said second arcuate extension of said winglet having an airfoil cross section; and
said airfoil cross section on said second arcuate extension having a lift surface and a pressure surface; and
said lift surface facing toward the perimeter of said rotor plane; wherein
the lift surface of the first arcuate extension directs flow in rotating vortices that begin in a direction toward the center of the rotor plane and the lift surface of the second arcuate extension directs flow in rotating vortices that begin in a direction toward the perimeter of the rotor plane, the two sets of vortices being counter rotating.

11. The rotor blade of claim 7 wherein;
the first arcuate extension is at least 10% longer than the second arcuate extension.

12. The rotor blade of claim 7 further comprising:
said first arcuate extension is swept away from said leading edge of said body such that a line tangent to the end of the first arcuate extension is between 5° and 65° with respect to the vertical centerline; and
said second arcuate extension is swept away from said leading edge of said body such that a line tangent to the end of the first arcuate extension is between 5° and 65° with respect to the vertical centerline.

* * * * *